United States Patent [19]

Ravenelle et al.

[11] 3,792,426

[45] Feb. 12, 1974

[54] TACTILE WARNING DEVICE FOR G-LOADING ANGLE OF ATTACK

[75] Inventors: Richard L. Ravenelle, Woonsocket, R.I.; Michael J. Moran, New Bern, N.C.; David E. Thorburn, Reno, Nev.

[73] Assignee: The United States of America as represented by the Secretary of the Air Force

[22] Filed: Apr. 6, 1972

[21] Appl. No.: 241,568

[52] U.S. Cl................. 340/27 R, 2/2.1 A, 340/407
[51] Int. Cl................................................ G08g 5/00
[58] Field of Search...................... 340/27 R, 27 SS, 340/27 AT, 407; 2/2.1 A

[56] References Cited
UNITED STATES PATENTS

| | | | |
|---|---|---|---|
| 2,871,849 | 2/1959 | Chatham | 2/2.1 A |
| 3,157,853 | 11/1964 | Hirsch | 340/27 R |
| 3,263,824 | 8/1966 | Jones | 340/407 |

Primary Examiner—Ralph D. Blakeslee
Attorney—Harry A. Herbert, Jr. et al.

[57] ABSTRACT

A G-loading or angle of attack tactile warning apparatus having a by-pass air flow path around the standard anti-G-suit pressure regulator with apparatus in the by-pass path to provide a pulse signal to the anti-G-suit when certain limits such as angle of attack or G-load have been exceeded. A signal from an accelerometer or angle of attack sensor is compared with a reference signal from a reference selector. The output of a comparator is used to permit a solenoid to be energized in response to the output of a square wave generator so supply a low frequency pulse to the anti-G-suit. In another embodiment, a comparator output operates a switch in the by-pass line to cause a fluidic oscillator to supply a pulse signal to the anti-G-suit.

6 Claims, 4 Drawing Figures

TACTILE WARNING DEVICE FOR G-LOADING ANGLE OF ATTACK

BACKGROUND OF THE INVENTION

In present systems for monitoring of the aircraft G-meter, the pilot must look inside the cockpit to see the meter. This is dangerous when the pilot is performing demanding high-G maneuvers, since G-limits are often inadvertently exceeded. Some system is needed that will allow the pilots to maintain appropriate maneuvering control while keeping their visual attention out of the cockpit.

BRIEF SUMMARY OF THE INVENTION

According to this invention, an attention-getting signal is provided through the pilot's anti-G suit to indicate maneuvering limit information such as G-loading or angle of attack. A by-pass path is provided around the standard anti-G valve normally connected between the air supply and the pilot's anti-G suit. An output signal from an accelerometer is used to initiate a pulse signal to a solenoid in the by-pass when the G-load exceeds a predetermined level.

The system can also be used to provide an indication when the angle of attack exceeds a predetermined limit. If both are used in a single system, the pulse signals must be sufficiently separated in frequency to be distinguishable by the pilot. The pulses may also be provided by means of a fluidic system.

IN THE DRAWINGS

DETAILED DESCRIPTION OF THE INVENTION

Figure 1:
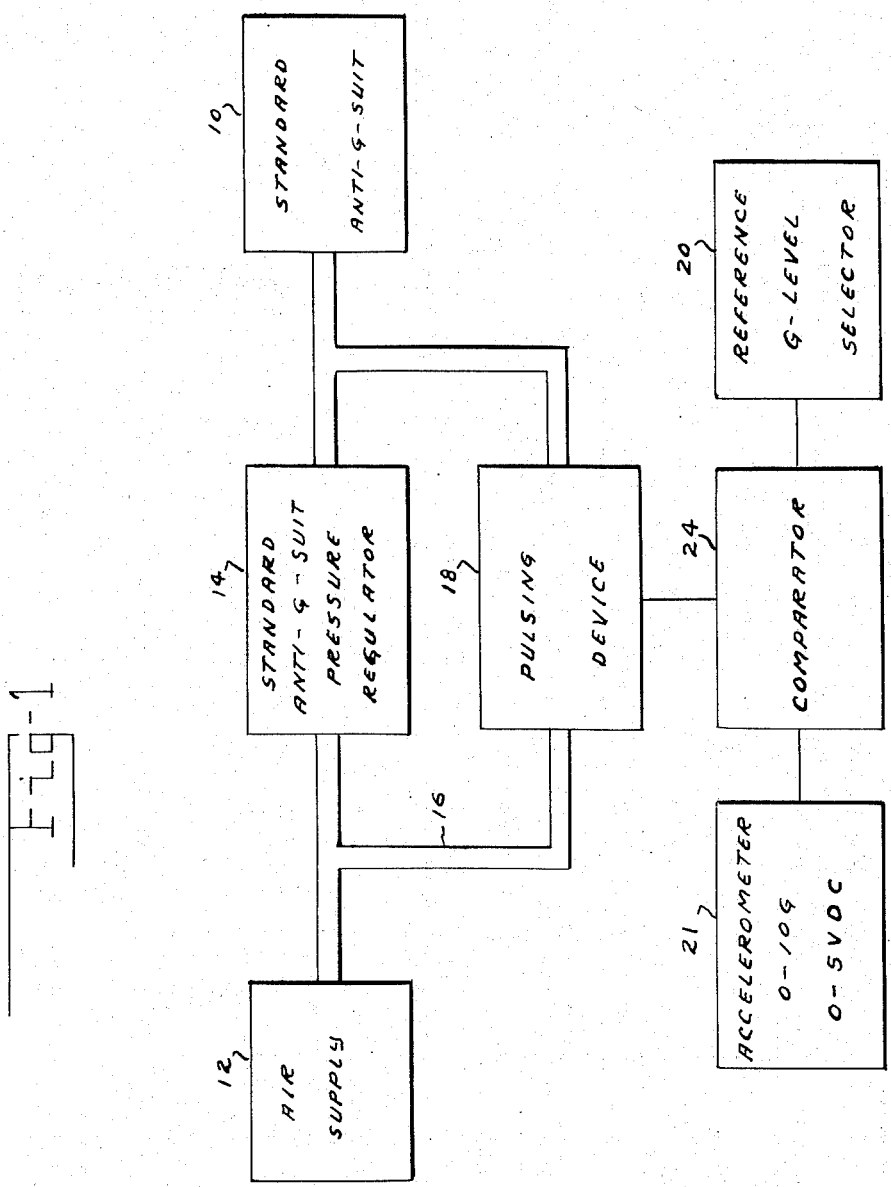
FIG. 1 is a schematic block diagram of the tactile warning apparatus of the invention.

Reference is now made to FIG. 1 of the drawing wherein a standard anti-G-suit indicated at 10 has the supply of air from supply 12 controlled by a standard anti-G-suit pressure regulator 14.

To give an indication of limit information, such as G-load information, a by-pass 16 is provided around the regulator valve 14 with a pulsing device 18 provided in the by-pass line. The desired G-load limit is set into a reference G-level selector 20. The output of a standard accelerometer 21 is compared with the output of the reference level selector 20 in a comparator 24. When the output of the accelerometer 21 exceeds the level set in selector 20, the pulsing device 18 is operated to supply a vibration of about 2-3 cps into the air bladder of the pilot's anti-G-suit. The system for supplying the pulsing to the pilot's anti-G-suit may take various forms, for example, it may be an electronic apparatus, as shown in FIG. 2, or a fluidic apparatus, as shown in FIG. 3.

Figure 2:
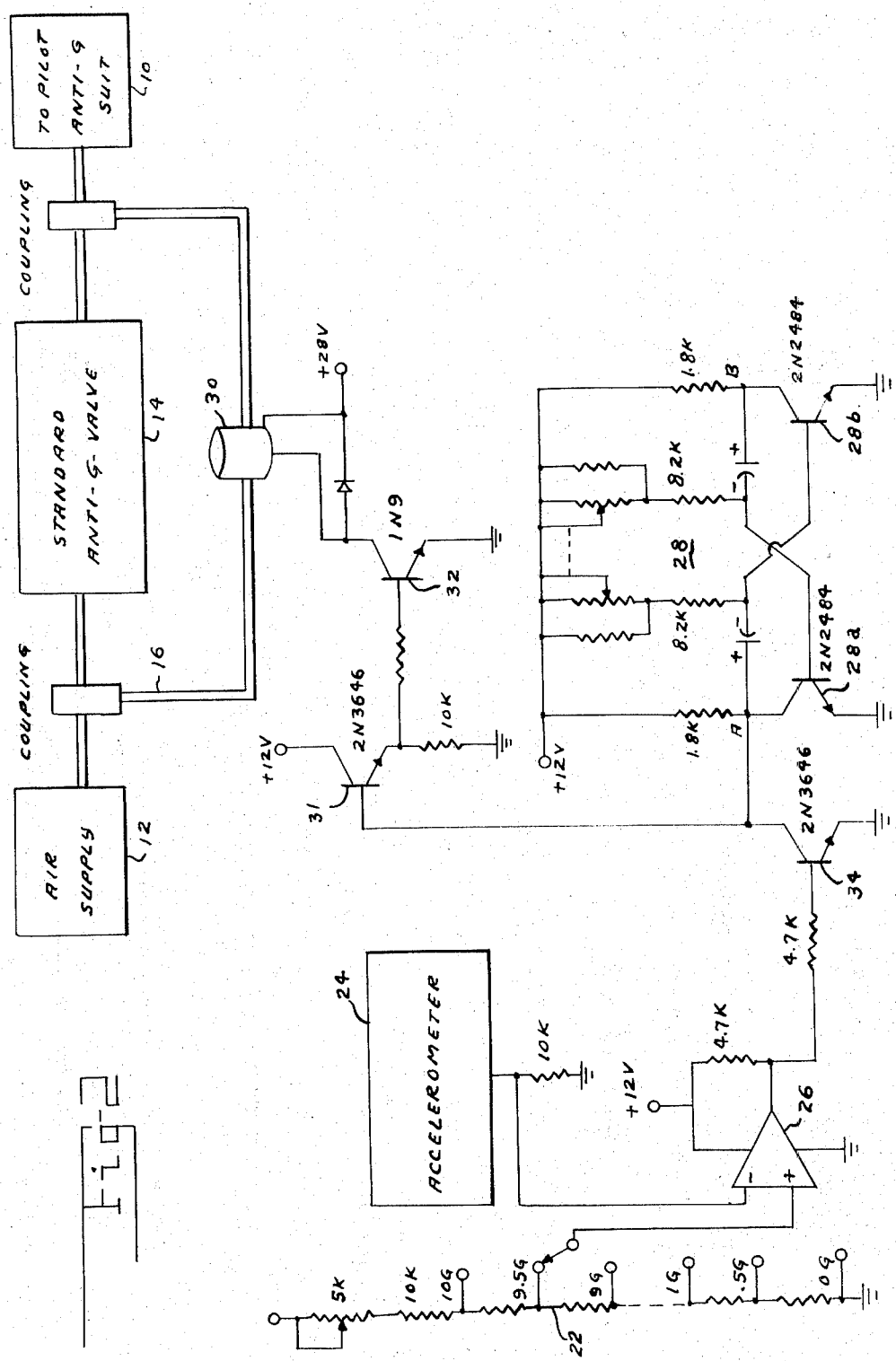
FIG. 2 is a schematic diagram of a control circuit for the device of FIG. 1.
Figure 3:
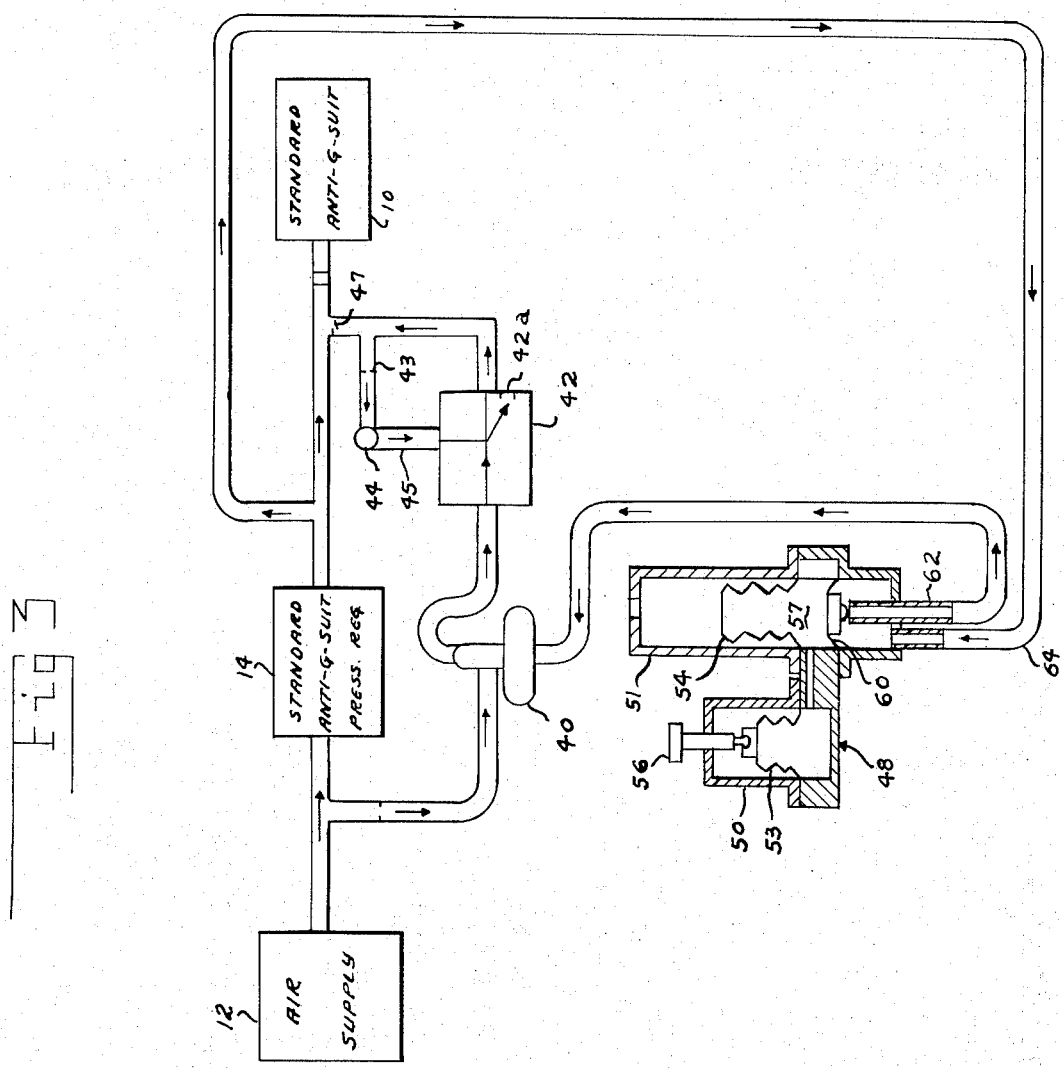
FIG. 3 is another control circuit which may be used with the device of FIG. 1.

In the device of FIG. 2, the reference G-level selector is a plural contact voltage divider 22. The output of accelerometer 24 and the output of the voltage divider are supplied to a conventional comparator 26.

As astable multivibrator 28 supplies a square wave signal to the solenoid 30 through a transistor amplifier 31 and a switching amplifier 32 whenever the accelerometer output exceeds the reference G-level set in selector 22. Normally, the multivibrator transistor amplifier 28a is disabled since it is substantially short circuited when transistor 34 is conducting. When the accelerometer voltage exceeds the reference level, the base voltage of transistor 34 drops to cause transistor 34 to substantially stop conduction which allows the multivibrator 28 to supply a low frequency square wave which can be applied to solenoid 30. This allows a pressure pulse signal to be applied to the anti-G-suit 10.

In the operation of the device of FIG. 2, air from supply 12 is supplied to pressure suit 10 through valve 14 in the normal manner known in the art. With the output of accelerometer 24 below the level set selector 22, the output of comparator 26 is substantially 12 volts so that transistor 34 is conducting and transistor 28a is substantially shorted so that multivibrator 28 cannot operate.

When the output of accelerometer 24 exceeds the level set in selector 22, the output of comparator 26 is substantially zero thus cutting off conduction in transistor 34. This removes the short circuit from transistor 28a which allows the free running multivibrator 28 to provide a square wave output to solenoid 30 through transistor amplifiers 31 and 32. When the square wave is high, solenoid 30 is energized to pass a pressure pulse to anti-G-suit 10; and, when the square wave is low, the solenoid valve is closed to block the flow to the pressure suit through by-pass line 16. Thus, a pressure pulse signal at the frequency of the multivibrator 28 output is supplied to the anti-G-suit 10 when the accelerometer output exceeds the limit set in selector 22.

The fluidic apparatus of FIG. 3 may also be used to supply a low frequency pulse signal to the anti-G-suit 10.

In this device, a low-high pressure switch 40 controls the flow of air to a fluid oscillator 42. This may be a conventional fluidic oscillator with a flow restrictor 43 and a fluidic compacitor 44 in the feedback path 45. The frequency of oscillation can be controlled by varying the size of capacitor 44.

A diode 47, which may be a simple check valve, prevents air from the G-suit leaking to the ambient air through the vent 42a in the fluidic oscillator.

In the device constructed the switch 40 was a pilot operated switch, Part No. 300135; the fluid oscillator 42 was an IX or/nor Gate, Part No. 300094; the flow restrictor 43 was a crimp resistor, Part No. 300048; the capacitor 44 was a fluidic capacitor, Part No. 300191, and the diode 47 was a diode (duck bill) check valve, Part No. 300282, all made by Fluidonics.

An adjustable G-level sensor 48 has two chambers 50 and 51 with bellows 53 and 54 with a liquid such as mercury in the fluid reservoir 57. The pressure head column in chamber 51 can be adjusted by turning adjustment screw 56 which controls the volumn in the fluid reservoir 57. Chamber 50 may be made transparent with level settings etched on the wall so that the top of bellows 53 will act as an indicator.

When air from the output pressure of regulator 14 is too low to counter the pressure in the fluid reservoir 57, no pressure pulse can flow to switch 40 to trigger it. When the critical G-level is reached as set by adjustment screw 56 and the air pressure from regulator 14 is slightly higher than the pressure in fluid reservoir 57, the diaphragm 60 is raised upward to open the end of tube 62 so that air from tube 64 can flow through tube 62 to operate trigger switch 40. Air is thus supplied to fluidic oscillator 42 to supply a low frequency pulse signal to the anti-G-suit 10.

In tests conducted, both device of FIG. 2 and FIG. 3 were found to give strong signals to all test subjects. No deleterious effects on the anti-G-protection for the anti-G-suit was evidenced. The signals were comfortable and very distinguishable.

Figure 4:
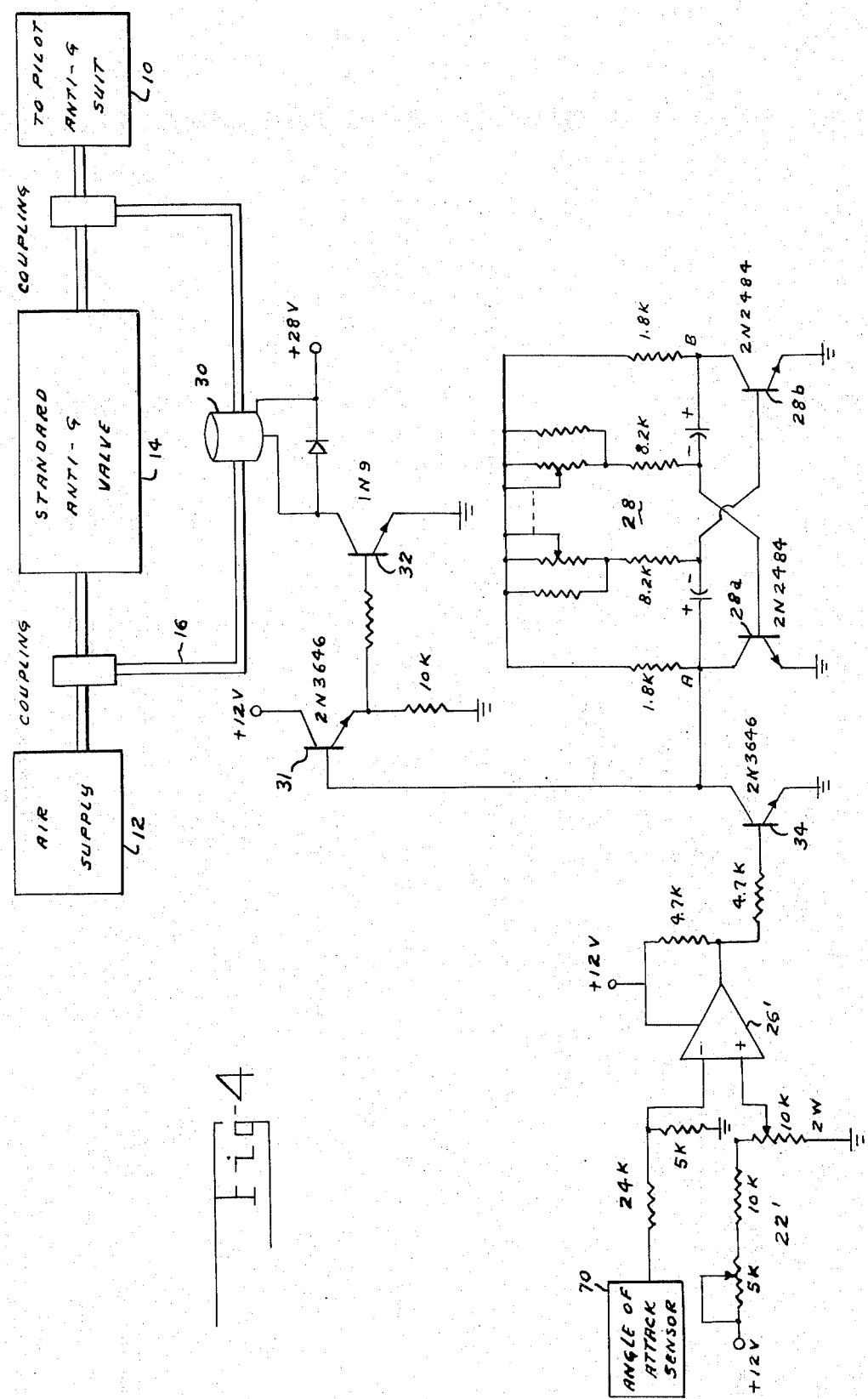
FIG. 4 is a schematic diagram of a control circuit according to another embodiment of the invention.

The device of FIG. 2 may be modified, as shown in FIG. 4, to give an indication to the pilot when the limit in angle of attack has been reached. The device of FIG. 4 is the same as the device of FIG. 2 except that, in addition to the reference level input from reference level selector 22', a signal from the angle of attack sensor 70 is supplied to comparator 26'. The remainder of the circuit is the same as in FIG. 2 and like reference numbers are used.

When both a G-level limit indication and an angle of attack indication are desired, separate parallel paths 16 would be provided with separate solenoids in each line. In this case, the angle of attack signal may be at a low frequency of about 1 to 1½ cps and the G-limit signal may be at a high frequency between 3 and 4 cps. The upper frequency limit, for either system, for desirable operation is about 10 cps.

There is thus provided a device for indicating to the pilot when certain maneuvering limits have been reached while allowing the pilot to keep his visual attention out of the cockpit.

We claim:

1. In combination with an anti-G-pressure suit system including an anti-G-pressure suit adapted to be worn by a pilot, means for supplying air under pressure to the anti-G-pressure suit and an anti-G-pressure regulator valve in the line between the air supply means and the anti-G-pressure suit; a tactile pulse warning system for indicating when certain flight maneuver limits have been exceeded, comprising: a by-pass air line around said anti-G-pressure regulator; means, in said by-pass line for supplying a low frequency pressure pulse to said anti-G-pressure suit; means, for providing a predetermined reference flight maneuver voltage level; means for comparing a corresponding flight maneuver signal with the reference voltage level; means responsive, to the output of said comparing means, for supplying the low frequency pressure pulse to the anti-G-suit only when the flight maneuver signal exceeds the reference voltage level.

2. The device as recited in claim 1, wherein said reference voltage level corresponds to a predetermined G-load and wherein said flight maneuver signal is an accelerometer output signal; said means for supplying the low frequency pulse to the anti-G-suit, including a solenoid valve in said by-pass line; a square wave generator; means for supplying the output of said square wave generator to said solenoid and means responsive to the output of said comparing means for preventing the application of an output signal to the solenoid for all times except when the accelerometer output signal exceeds the reference voltage level.

3. The device as recited in claim 2 wherein said square wave generator is a two transistor free running multivibrator circuit; said means, responsive to the output of said comparing means for preventing the application of an output signal to the solenoid for all times except when the accelerometer output signal exceeds the reference voltage level, including means, responsive to the output of said comparing means and connected across one of the transistors of said multivibrator circuit for normally shorting said one transistor and for removing the short from said one transistor when the accelerator output signal exceeds the reference voltage level.

4. The device as recited in claim 1, wherein said reference voltage level corresponds to a predetermined angle of attack and wherein said flight maneuver signal is an angle of attack indicating signal; said means for supplying the low frequency pulse to the anti-G-suit, including a solenoid valve in said by-pass line; a square wave generator; means for supplying the output of said square wave generator to said solenoid and means responsive to the output of said comparing means for preventing the application of an output signal to the solenoid for all times except when the angle of attack indicating signal exceeds the reference voltage level.

5. The device as recited in claim 2 wherein said square wave generator is a two transistor free running multivibrator circuit; said means, responsive to the output of said comparing means for preventing the application of an output signal to the solenoid for all times except when the angle of attack indicating signal exceeds the reference voltage level, including means, responsive to the output of said comparing means and connected across one of the transistors of said multivibrator circuit for normally shorting said one transistor and for removing the short from said one transistor when the angle of attack indicating signal exceeds the reference voltage level.

6. The device as recited in claim 1, wherein said reference voltage level corresponds to a predetermined G-load and wherein said flight maneuver signal is an accelerometer output signal; said means for supplying the low frequency pulse to the anti-G-suit, including a pressure responsive valve in said by-pass line; a fluid oscillator in said by-pass line; an adjustable G-sensor including a first chamber and a second chamber; means including a bellows in each of said chambers for forming a fluid reservoir in such chambers; means for adjusting the pressure head in the fluid reservoir to thereby set the desired G-level limit; means responsive to the output pressure of said pressure regulator for supplying the output pressure of said pressure regulator to said pressure responsive valve when the regulator output pressure exceeds the fluid reservoir pressure head to thereby supply a pulse signal from said fluid oscillator to said anti-G-suit.

* * * * *